United States Patent
Jean-Louis et al.

(10) Patent No.: US 11,288,055 B2
(45) Date of Patent: Mar. 29, 2022

(54) MODEL-BASED DIFFERENCING TO SELECTIVELY GENERATE AND DEPLOY IMAGES IN A TARGET COMPUTING ENVIRONMENT

(71) Applicant: International Business Machines Corporation, Armonk, NY (US)

(72) Inventors: Nerla Jean-Louis, Champaign, IL (US); Saurabh Sinha, Danbury, CT (US); Tara Astigarraga, Fairport, NY (US); Richard Baxter Hull, Chatham, NJ (US); Vugranam C. Sreedhar, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/793,777

(22) Filed: Feb. 18, 2020

(65) Prior Publication Data

US 2021/0255847 A1  Aug. 19, 2021

(51) Int. Cl.
*G06F 8/65* (2018.01)
*G06Q 10/10* (2012.01)

(52) U.S. Cl.
CPC ............... *G06F 8/65* (2013.01); *G06Q 10/10* (2013.01)

(58) Field of Classification Search
USPC ........................................................ 717/170
See application file for complete search history.

(56) References Cited

U.S. PATENT DOCUMENTS

| | | | |
|---|---|---|---|
| 8,997,088 B2 | 3/2015 | Gurikar et al. | |
| 10,067,755 B2* | 9/2018 | Kaminski | G06F 8/65 |
| 10,069,940 B2* | 9/2018 | Smith | H04L 67/42 |
| 10,379,847 B2* | 8/2019 | Narayanan | G06F 8/36 |
| 2003/0158919 A1 | 8/2003 | Fomenko | |
| 2006/0184926 A1 | 8/2006 | Or et al. | |

(Continued)

FOREIGN PATENT DOCUMENTS

CN   104699508   8/2017

OTHER PUBLICATIONS

Günalp et al.; "Rondo: A Tool Suite for Continuous Deployment in Dynamic Environments"; 2015 IEEE International Conference on Services Computing (pp. 720-727); 2015 (Year: 2015).*

(Continued)

*Primary Examiner* — Qing Chen
*Assistant Examiner* — Clint Thatcher
(74) *Attorney, Agent, or Firm* — Amin, Turocy & Watson, LLP

(57) ABSTRACT

A system includes a memory that stores computer-executable components and a processor, operably coupled to the memory, that executes the computer-executable components stored in the memory. The computer-executable components include a deployment generator component that analyzes current component versions of application services and determines differences with previous deployment versions of the application services deployed to a target computing environment. A service deployment output component generates instructions to selectively update the application services to the target computing environment based on the determined differences between the previous deployment versions and the current component versions of the application services.

20 Claims, 14 Drawing Sheets

(56) References Cited

U.S. PATENT DOCUMENTS

| | | | |
|---|---|---|---|
| 2008/0168017 A1 | 7/2008 | Sreedhar et al. | |
| 2010/0242032 A1* | 9/2010 | Ladki ................. | G06F 11/1433 |
| | | | 717/171 |
| 2011/0271246 A1* | 11/2011 | Fujihara ................. | G06F 8/71 |
| | | | 717/104 |
| 2011/0282995 A1* | 11/2011 | Gass ................. | G06F 8/65 |
| | | | 709/226 |
| 2014/0304694 A1* | 10/2014 | Huff, II ................. | G06F 8/65 |
| | | | 717/168 |
| 2015/0199197 A1 | 7/2015 | Maes et al. | |
| 2016/0041819 A1* | 2/2016 | Mantena ................. | G06F 8/65 |
| | | | 717/170 |
| 2017/0168797 A1 | 6/2017 | Pogrebinsky | |
| 2017/0171020 A1 | 6/2017 | Wei et al. | |
| 2018/0004509 A1 | 1/2018 | Narasimhan et al. | |
| 2018/0060066 A1* | 3/2018 | Rihani ................. | G06F 8/71 |
| 2019/0227780 A1 | 7/2019 | Keyser | |

OTHER PUBLICATIONS

Mell et al., "The NIST Definition of Cloud Computing," Recommendations of the National Institute of Standards and Technology, NIST Special Publication 800-145, Sep. 2011, 7 pages.

\* cited by examiner

MODEL-BASED DIFFERENCING TO SELECTIVELY GENERATE AND DEPLOY IMAGES IN A TARGET COMPUTING ENVIRONMENT

BACKGROUND

The subject disclosure relates to application services, and more specifically to selectively generating and deploying application service images in a target computing environment.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate automated deployment of application services.

According to one or more embodiments, a system is provided. The system can include a memory that stores computer-executable components and a processor, operably coupled to the memory, that can execute the computer-executable components stored in the memory. The computer-executable components can include a deployment generator component that can analyze current component versions of application services and can determine differences with previous deployment versions of the application services deployed to a target computing environment. A service deployment output component can generate instructions to selectively update the application services to the target computing environment based on the determined differences between the previous deployment versions and the current component versions of the application services.

According to one or more other embodiments, a computer-implemented method can include analyzing, by a system operatively coupled to a processor, current component versions of application services. The computer-implemented method can include determining, by the system, differences between previous deployment versions and the current component versions of the application services. The computer-implemented method can include generating instructions, by the system, that selectively update the application services to the target computing environment based on the determined differences between previous deployment versions and the current component versions of the application services.

According to yet one or more other embodiments, a computer program product that facilitates deployment of an application can be provided. The computer program product can include a computer readable memory having program instructions embodied therewith. The program instructions executable by a processor to cause the processor to analyze, by the processor, current component versions of application services; determine, by the processor, differences between previous deployment versions and the current component versions of the application services; and generate, by the processor, instructions to selectively update the application services to a target computing environment based on the determined differences between previous deployment versions and the current component versions of the application services.

DETAILED DESCRIPTION

Figure 1:
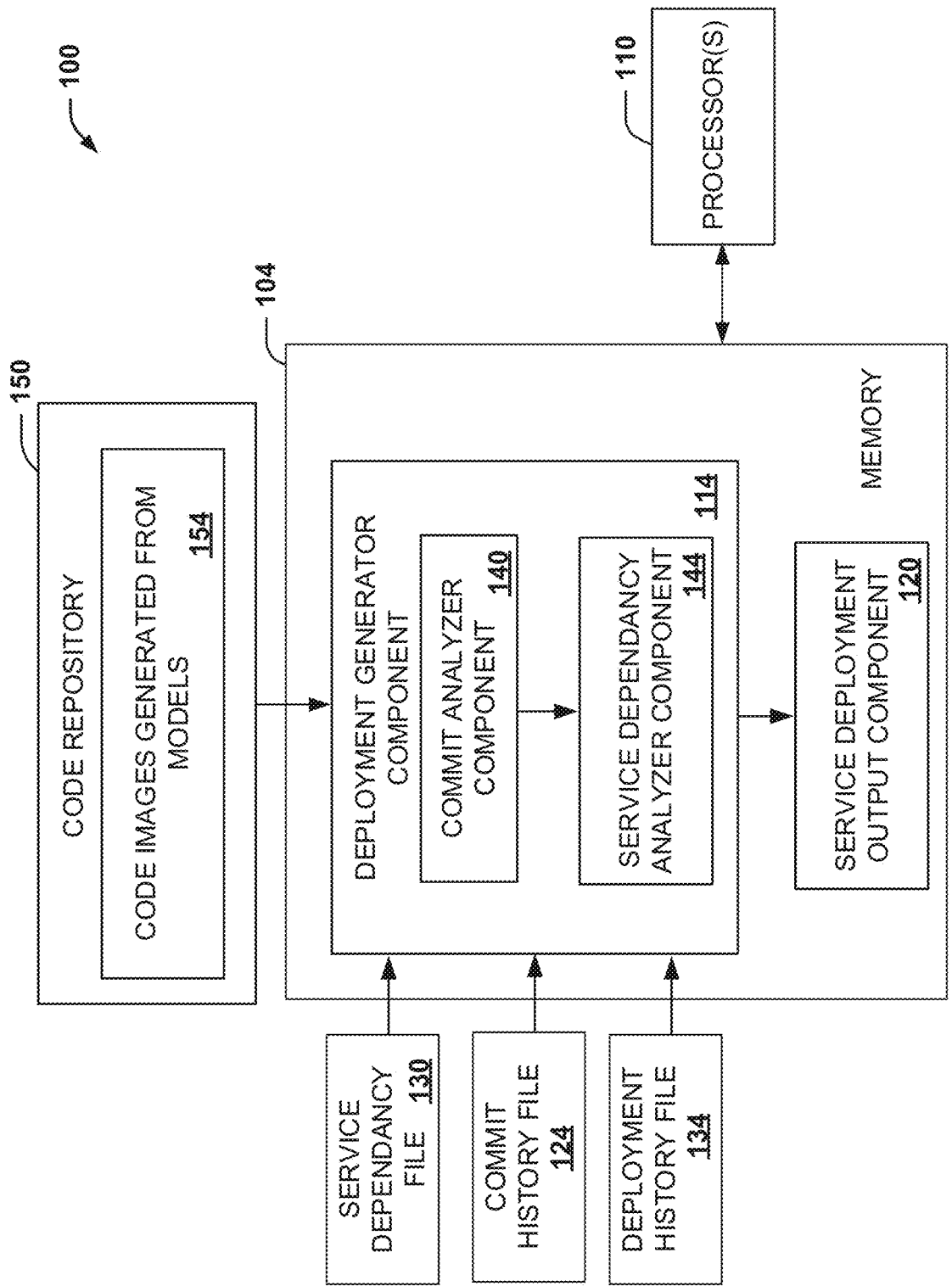
FIG. 1 illustrates a block diagram of an example, non-limiting system that facilitates automated application deployment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Modern software systems increasingly use a microservices architecture with independent components collaborating having various component dependencies within such architecture. With agile development gaining popularity for example, the ability to quickly deploy and test changes made to a given component is desirable for efficient and timely introduction of new application components, updating changes to existing components, and/or implementing system-wide changes. In today's environment, as changes are made in component-based solutions, there is no straightforward or efficient process to not only understand the dependencies between components, but also to efficiently correlate changes made while also managing impacts across related application components when deployed. Since component dependencies and/or component deployment schemes are often poorly understood and/or defined, this difficulty often leads to rebuilding and redeploying non-relevant portions of an underlying application for non-related components. In many inefficient systems, the entire system may have to be re-built causing unnecessarily long deployment times. This can be especially problematic for currently running systems when only a small portion of the system is scheduled for an update. If the system is running or in use, for example, long deployment times can disrupt availability of new features and code patches to end-users. Thus, automated systems/methods for facilitating deployment of components that define application services for an application are beneficial. Various embodiments described herein can address one or more of these issues.

Embodiments described herein can include systems, computer-implemented methods, and/or computer program products that facilitate deployment of an application that can include a plurality of application services deployed to a target computing environment. To facilitate such deployment, a deployment generator component can analyze current component versions of the application services that determine differences with respective previous deployment versions of the application services to target computing environment(s). The current component versions can be automatically generated from code generators that can be driven from abstracted code models such as from instructions specified by a model-driven engineering system that can include, for example, a Unified Modeling Language (UML). In some examples, the current component versions can include code images for the application services, a commit history file representing code image versions of the application services, a service dependency file representing code image dependency relationships between the application services, and/or a deployment history file representing a deployment version of the respective image code versions of the application services.

Operative with the deployment generator component, a service deployment output component can generate instructions (e.g., user deployment instructions and/or automated system deployment instructions) that selectively update the application services to the target computing environment based on the determined differences between previous deployment versions and the current component versions of the application services. As such, efficient and rapid deployment of components can be achieved since components that have changed can be automatically identified along with other components dependent on such changes being similarly identified. Thus, rather than redeploying and/or massively updating significant portions of an existing system due to conventional uncertainties of existing deployment methods, the example embodiments described herein can selectively update a relatively smaller corpus of system components that have been impacted by the change. This can be achieved by automatically determining component differences and deploying the respective components that have been identified along with changes based on dependent component relationships. This can substantially increase deployment efficiency for application services by mitigating changes to the larger application based on determined component differences and their respective component dependencies which ultimately define a given application and their associated application services.

In some examples, embodiments described herein can focus on a class of applications where model-driven engineering can be used to automatically generate applications from models, where the generated applications can be deployed using a microservices architecture, for example, on a cloud infrastructure in one example. Models can be created for respective components of the system and can be updated by users/systems to create updates to the components. Executable code can be generated automatically from the models and associated model code templates. Differencing of the models (e.g., via model comparators) can determine which code generators to run, for example, in order to generate executable code from the abstracted model descriptions. Such differencing of the code files found in the respective changed components of a system, for example, can be employed to update the system. For a given component, the embodiments described herein can account for files that are associated with the respective component and can further discover associated dependencies between different components of the system.

Given that there can be multiple versions of a system running in parallel (e.g., a development and production version), the embodiments described herein can utilize information based on what versions of the respective components from the associated versions are in use or have been built for the various portions of a running system. Applying this information, the embodiments described herein can automatically compute a list of services and/or components to be rebuilt as well as the services and/or components that merely should be updated to newer images. Thus, in some embodiment examples, deployment systems and methods described herein can be implemented independent of language and technology and as such, can be designed to be utilized in real-life and/or running deployment scenarios. By leveraging model-driven development systems, generating system components specified by such models, isolating code changes to relevant components while leaving the larger component system substantially undisturbed, and accounting for dependencies between components, exemplary embodiments described herein can provide improved/efficient application services deployment in a running, target computing environment. This improvement described herein can be contrasted to existing deployment systems/methods that can negatively impact much larger portions of the system and thus can significantly slow deployment time. Such embodiments described herein thus can constitute a concrete and tangible technical improvement over existing deployment systems and methods.

FIG. 1 illustrates an example, non-limiting system 100 that facilitates automated application deployment in accordance with one or more embodiments described herein. The system 100 can include a memory 104 that stores computer-executable components and a processor 110 (or processors), operably coupled to the memory, that can execute the computer-executable components stored in the memory. The computer-executable components can include a deployment generator component 114 that facilitates deployment of an application that includes a plurality of application services to a target computing environment. As used herein, the term application service refers to a subset of functionality that contributes to an application. As used herein, the term application refers to the overall components including services that contribute to the execution and operation of a given duty of a computing system. For instance, a mail server can be considered an application that exposes two or three services such as a send service (e.g., SMTP service) used to send email, and a read service to read e-mail (e.g., POP3 and an IMAP service) among other services of the mail server. Examples of application services can include services such as load balancing, application performance monitoring, application acceleration, autoscaling, microsegmentation, service proxy and service discovery to deploy, run, and improve performance of applications. For a cloud-computing example, example application services can include load balancing, application firewalling, and service discovery among other services that can be provided for applications running in non-public, public, hybrid, and/or multi-cloud environments.

Other example services can include file storage services, backup services, and disaster recovery services. In some embodiments, example services can be any task or collection of tasks that perform computer-executable operations on a computerized platform. Example applications can include business applications including accounting and financial operations, engineering applications, design/development applications, inventory applications, and purchasing applications. In some embodiments, example applications can be any program or collection of programs that fulfill computer-executable functions of an entity within the framework of a computerized platform. Applications can be disbursed among a plurality of computing resources for a public and/or non-public entity operating in accordance with an open cloud environment and/or non-public network environment. The deployment generator component 114 can analyze current component versions (e.g., current code images, deployment files) of the application services that determine differences with previous deployment versions of the application services to the target computing environment (e.g., cloud environment, non-public intranet environment, public Internet environment).

A service deployment output component 120 can generate instructions to selectively update the application services to the target computing environment based on the determined differences between previous deployment versions and the current component versions of the application services. The instructions that selectively update the application services to the target computing environment can include instructions to guide users on which code images or other files (e.g., deployment files) are to be updated and/or the instructions can include automated commands to direct computing systems/applications to perform the updating. By determining what components (e.g., models, deployment configurations) have changed and what components are currently deployed in a given application and their respective services, the embodiments described herein can perform directed updates that can be focused on the respective components and their dependencies that have changed while leaving unaffected components substantially in tact thus mitigating deployment processing and time. This can mitigate the impact of deployment and can improve the efficiency of component deployment over existing deployment systems.

The current component versions described herein can include code images to execute the application services which have been generated based on model specifications from a modeling language such as described below with respect to FIGS. 2 and 3. The current component versions can also include a commit history file 124 representing code image versions of the application services, a service dependency file 130 representing code image dependency relationships between the application services and/or components of the respective services, and a deployment history file 134 representing a deployment version of the respective image code versions of the application services.

A commit analyzer component 140 can process the commit history file 124 and can generate a first changed files dataset indicating file changes between a previous deployment of the code image versions in commit history file and subsequent code image versions that were created since the previous deployment. As used herein, the term dataset can represent one or more data output formats that can indicate changed status from a previous code and/or system deployment state and used to indicate direct component deployments of the embodiments described herein. The term dataset can include for example, binary data, formatted data, printed data, file data, and coded data (e.g., coded output, audible data). In some embodiments, the term dataset can include any type of data format. The commit analyzer component 140 can also process the deployment history file 134 and can generate a second changed files dataset indicating file changes between a previous build of the code image versions in deployment history file and subsequent code image versions that were built since the previous build.

A service dependency analyzer component 144 can process the first changed files dataset from the commit analyzer component 140 along with the service dependency file 130 and can generate a third changed file dataset indicating files changes since a last deployment of active component versions for respective active deployments of the application services. Also, the service dependency analyzer component 144 can process the second changed files dataset from the commit analyzer component 140 along with the service dependency file 130 and can generate a fourth changed file dataset indicating files changes since a last build of respective component versions for the respective application services. Further details of file processing computer-implemented methods as described herein are described below with respect to FIGS. 5 through 7 that can implement various aspects of the components depicted in the system 100.

In an example embodiment, the service deployment output component 120 can generate the instructions that can selectively update the application services to the target computing environment based on the third changed files data set or the fourth changed files dataset that represent files changed per active deployment per service and files changed per service. For example, the instructions that selectively update the application services to the target computing environment can include at least one of services to update per active deployment based on the third changed files dataset or services to build based on the fourth changed files dataset. As mentioned supra, the instructions generated by the service deployment output component 120 can be directed to at least one of a user charged with application deployment and/or an automated system to facilitate the deployment of the current component versions of the application services. A code repository 150 (e.g., structured database or databases) can store the current component versions that includes at least one code image 154 to produce the current component versions based on instructions specified by a model-driven engineering model. Example instructions specified by the model-driven engineering model can include a Unified Modeling Language (UML) but other language models are possible to specify models that can generate the code images 154.

Figure 2:
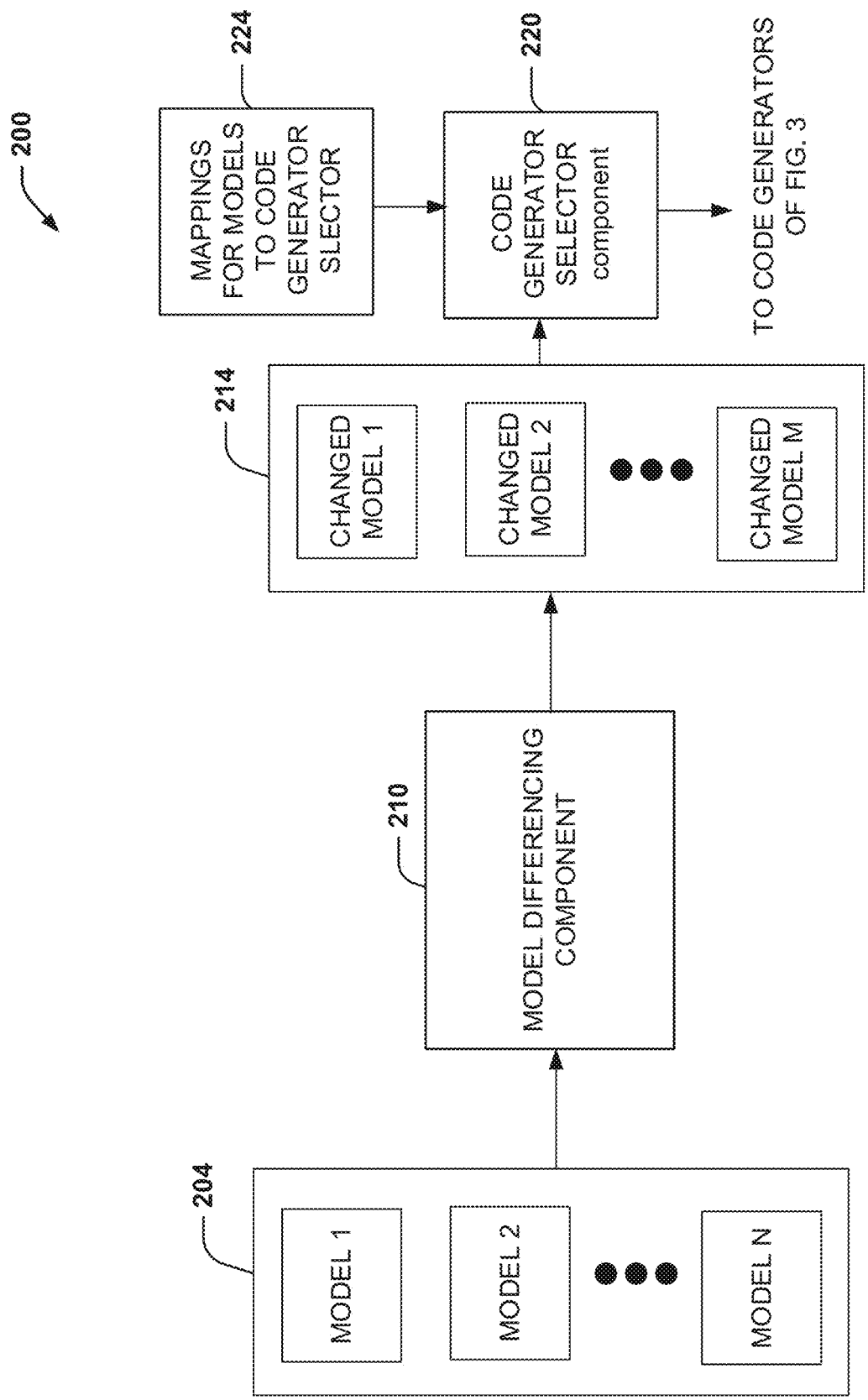
FIG. 2 illustrates a block diagram of an example, non-limiting system that facilitates determining model differences and selecting code generators that facilitates automated application deployment in accordance with one or more embodiments described herein.

FIG. 2 illustrates an example, non-limiting system 200 that facilitates determining model differences and selecting code generators to facilitate automated application deployment in accordance with one or more embodiments described herein. At 204, one or more models shown as model 1 through model N, N being a positive integer equal to or greater than 1, can be processed by a model differencing component 210 that can determine differences between previous versions of the respective models and current versions that may have been updated and/or added/removed from the previous model versions. Current versions can be determined, for example, based on recent changes to the previous model versions that are implemented according to a build process as described herein. The changes between past stored model versions and model-versions that have changed can be due, for example, to revision and/or replacement of past model versions. As used herein, the term model refers to an abstracted language that describes various aspects of software functionality yet is not implemented as a specific computer language. One example of such modeling language that can create the models 204 is a Unified Modeling Language (UML) although other abstract modelling languages may be used. The models 204 can represent different services in the system 200. Multiple model versions such as Changed Model 1 and Changed Model 2 can indicate different versions of the models 204, where an arbitrary number of models can be implemented depending on the number of services. The model differencing component 210 can detect changes in the models 204 such as via a digital version comparator, for example, that can examine revision nomenclature associated with the models that can also include metadata that describes model differences.

The models 204 can be developed according to Model-Driven Software Engineering (MDSE) paradigm in one example. Such models 204 can be considered as primary artifacts from which parts of a software system can be automatically generated. As such, the models 204 can be more abstract representations of the system to be built. Thus, MDSE can improve productivity and communication by supplying development technologies and tools in order to be suitably applied. Various example terms and approaches that are somewhat analogous to MDSE include model-driven architecture, model-driven engineering, and model-driven development. In some embodiments, any architecture that operates with models as described herein can be employed.

The models 204 can represent an abstraction of substantially all or some portion of an application service for understanding the service functionalities before building the service into executable code. Models 204 can act as a description of the domain of the system to be built and can focus on relevant aspects of the domain such as for example, a class diagram of the domain. As mentioned, the models 204 can provide an abstract representation of the system to be built such as for example, where a component diagram specifies components of a system to be built. In another example, the models 204 can be employed for documentation, where the abstraction of the models can facilitate understanding the system in a more rapid/efficient manner. A documentation example can include a class diagram of the noted entities in a system and can be explained in a document associated with the diagram. The models 204 can also be employed for testing in another example. The models 204 can be employed in software and/or hardware engineering (e.g., abstract descriptions of VHDL) and can be employed for domain modeling, code generation, static analysis, refactoring/transformation, automated testing, and/or documentation, for example, as previously mentioned.

The model differencing component 210 can output models 214 that have changed from previous versions and shown as changed model 1, changed model 2, through changed model M, with M being a positive integer greater than or equal to 1. In many examples, the integer M used for the changed models 214 is likely different than the integer N representing the models 204 since the number of models detected as changed at 214 is often times less than the total number of models represented at 204. The changed models 214 can be fed to a code generator selector component 220 that can identify services to generate and can employ code mappings as an input file 224 to determine which code generators to select based on the changed models and associated services. Output from the code generator selector component 220 can be fed to code generators selected for the respective changed models 214 which are illustrated and described below with respect to FIG. 3.

Figure 3:
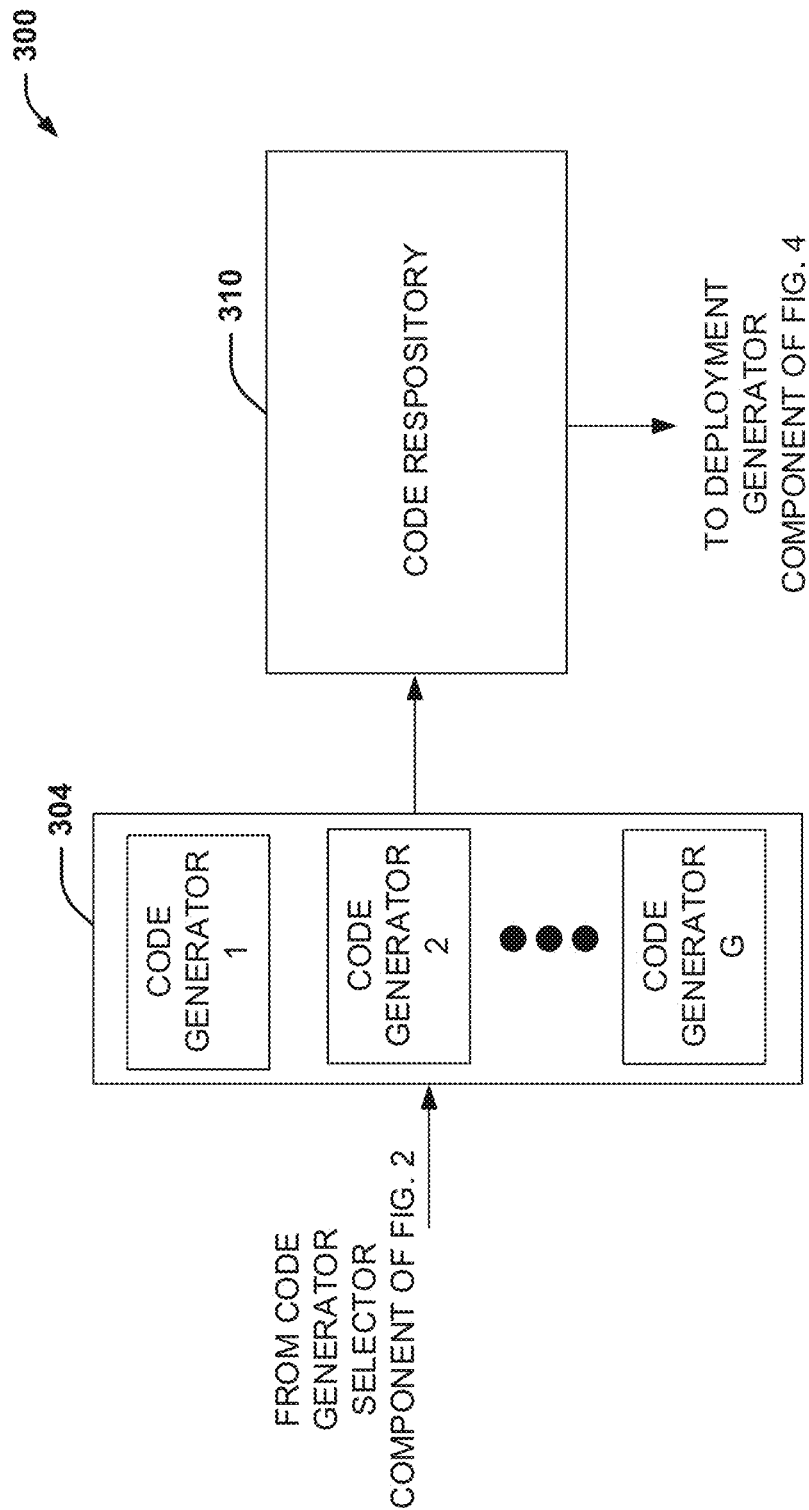
FIG. 3 illustrates a block diagram of an example, non-limiting system that facilitates generating code model images based on determining model differences the system FIG. 2 that facilitate automated application deployment in accordance with one or more embodiments described herein.

FIG. 3 illustrates an example, non-limiting system 300 that facilitates generating code model images based on determined model differences and code generator selection of FIG. 2 to facilitate automated application deployment in accordance with one or more embodiments described herein. A plurality of code generators 304 can be provided and shown as code generator 1, code generator 2, through code generator G, with G representing a positive integer greater than or equal to 1. The respective code generators can be selected based on commands received from the code generator selector component 220 of FIG. 2 and based on which models have changed since previous builds and/or deployment of services associated with the models. The code generators 304 can convert abstract model language into different executable code images/formats that can be stored in a code repository 310. Substantially any conversion can be possible from the abstract modeling language to the code images in the code repository 310. These can include modeling language conversions to other programming languages such as C, C++, JAVA, JAVA virtual machine, Adobe document format, and assembler format, for example, which can be further compiled and/or assembled upon a build command issued by the respective code generators 304. In some examples, modeling language conversions can include a conversion that converts one program language format to at least one other program language format.

The code generators 304 can generate code and/or associated code images from schemas or other sources of information. For example, data access objects can be generated from database schema files. Code can be generated from wizards and can generate skeletons of applications from abstract models. Complete applications can be generated from high-level domain-specific languages (DSL) and can be obtained from information processing from existing documents. In an example, code can be generated from information obtained by analyzing code written using other languages or frameworks. This can include generating code using programming languages with metaprogramming features, for example. Some integrated development environments (IDEs) can have functionality to generate boilerplate code, such as the equals or hash-code methods in Java. Thus, code generators 304 can be used for small portions of code and/or complete applications. Code generators 304 can be used with widely different programming languages and can use different modelling techniques.

Figure 4:
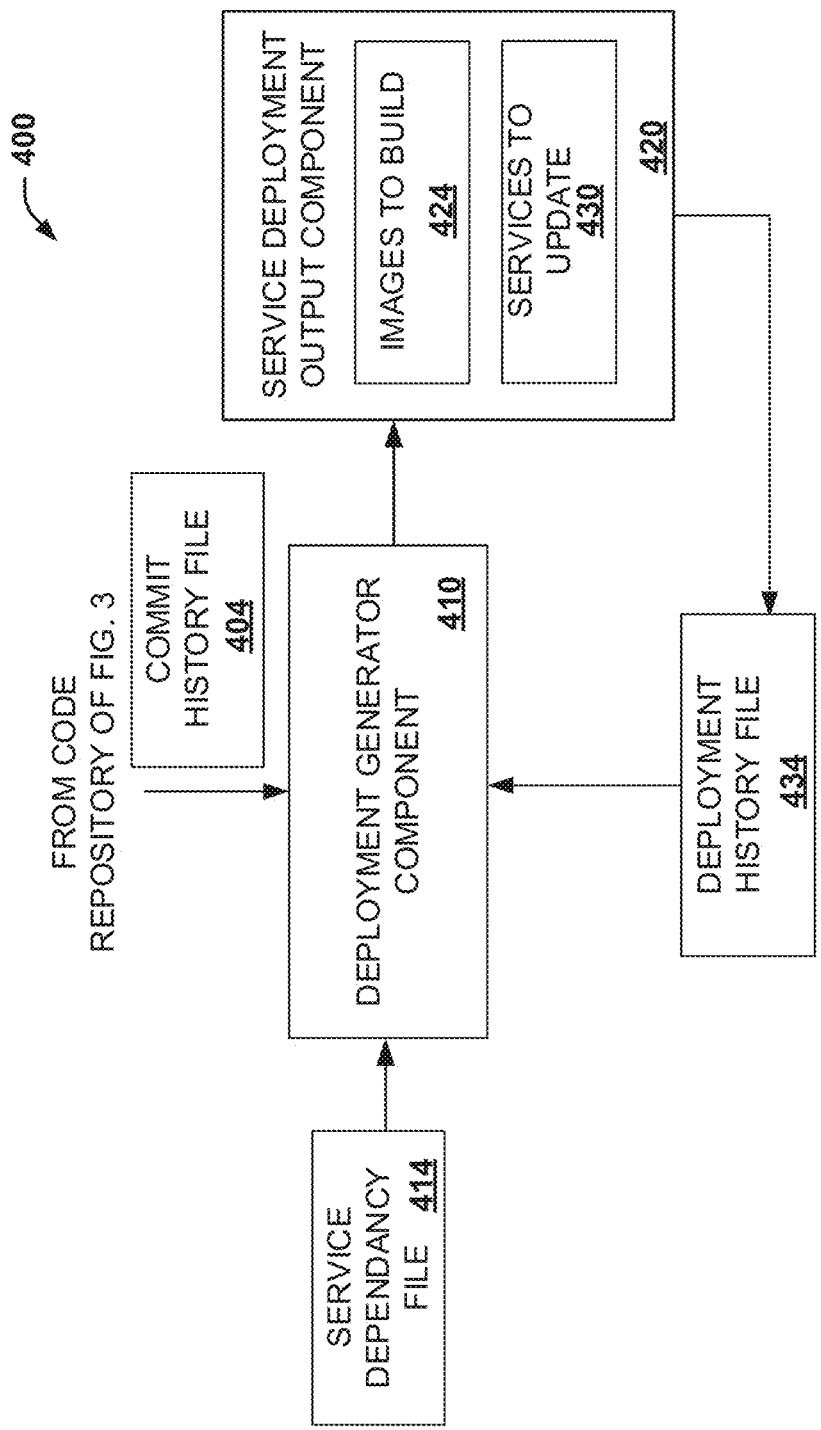
FIG. 4 illustrates a block diagram of an example, non-limiting system that includes a deployment generator component and service deployment output component that facilitate automated application deployment in accordance with one or more embodiments described herein.

FIG. 4 illustrates an example, non-limiting system 400 that includes a deployment generator component and service deployment output component that facilitate automated application deployment in accordance with one or more embodiments described herein. Code images and other files such as a commit history file 404 can be received from the code repository 310 of FIG. 3 and can be processed by a deployment generator component 410. A service dependency file 414 can include application service dependencies and files that map to the respective services described herein. As mentioned previously, the code repository shown at 310 of FIG. 3 provides stored generated code images to the deployment generator component 410 that can efficiently deploy the stored code images as described herein below with respect to the computer-implemented methods depicted in FIGS. 5 though 7. Output from the deployment generator component 410 can be provided to a service deployment output component 420 that can generate listings of images to build at 424 and/or services to update 430 that can be utilized by users and/or systems to facilitate deployment as described herein. The listings can be generated, for example, as a file that details the affected images to load and/or the specific services to update based on the detected changes between previous deployments and current deployment versions. Further description of generating listings is provided at 740 of FIG. 7. As shown, a deployment history file 434 can be fed back to the deployment generator component 410 representing previous deployment history for the target system to be deployed.

Figure 5:
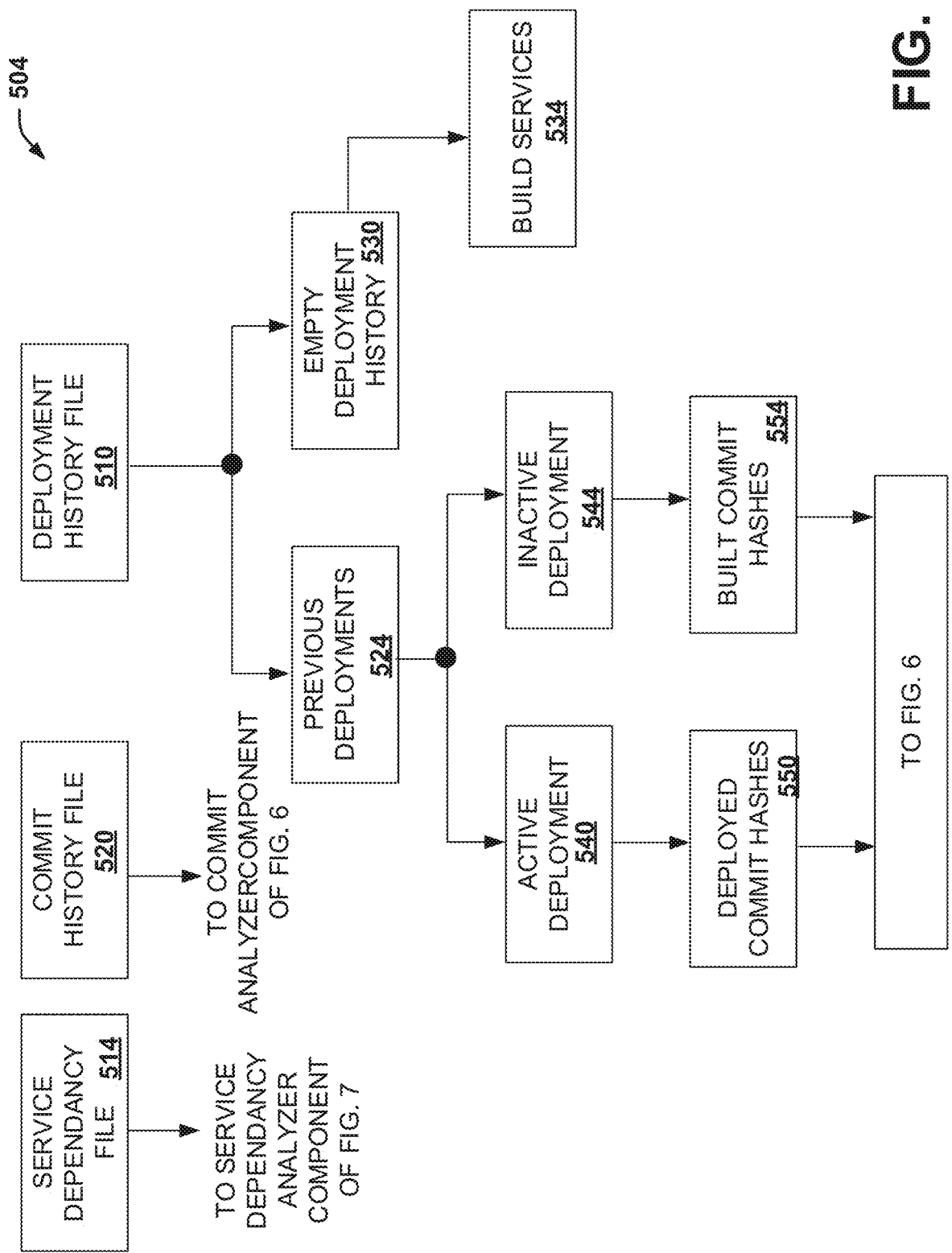
FIG. 5 illustrates a flow diagram of an example, non-limiting method that implements a deployment generator component by processing a deployment history file that facilitates automated application deployment in accordance with one or more embodiments described herein.

FIG. 5 illustrates an example, non-limiting computer-implemented method 504 that implements a deployment generator component (e.g., deployment generator component 114 of FIG. 1, 410 of FIG. 4) as described herein that processes a deployment history file 510 that can facilitate automated application deployment in accordance with one or more embodiments described herein. As shown, a service dependency file 514 can be received by the computer-implemented method 504 and can be passed to a service dependency analyzer component for further processing described below with respect to the computer-implemented method of FIG. 7. Also, a commit history file 520 can be received by the computer-implemented method 504 and can be passed to a commit analyzer component for further processing as described below with respect to the computer-implemented method FIG. 6. The deployment history file 510 can include information regarding deployments such as for example, what version/commit is running for the respective services with respect to the associated deployments of the system. At 524 of the computer-implemented method 504, previous deployments can process lists of deployments and a version of the system deployments that are running.

At 530, an empty deployment history can indicate no previous deployments were detected for a given component and/or service which can be followed by a build services at 534 that can build the non-previously deployed components. From processing previous deployments at 524, an active deployment process 540 can generate lists of active/running deployments. The lists at process 540 can be generated, for example, by outputting data to a file indicating respective components of a given deployment that active such as components that are frequently called and/or running such as components that are executing background or foreground tasks. An inactive deployment process 544 can generate lists of inactive/previously running deployments. The lists at process 544 can be generated, for example, by outputting data to a file indicating respective components of a given deployment that are no longer active or running. At 550, deployed committed hashes can be processed which can represent versions of components of deployed running systems. At 554, built commit hashes can be processed which represent versions of previously built components of systems. Output from 550 and 554 can be sent to be processed by a commit analyzer component depicted and described below with respect to the computer-implemented method of FIG. 6.

Figure 6:
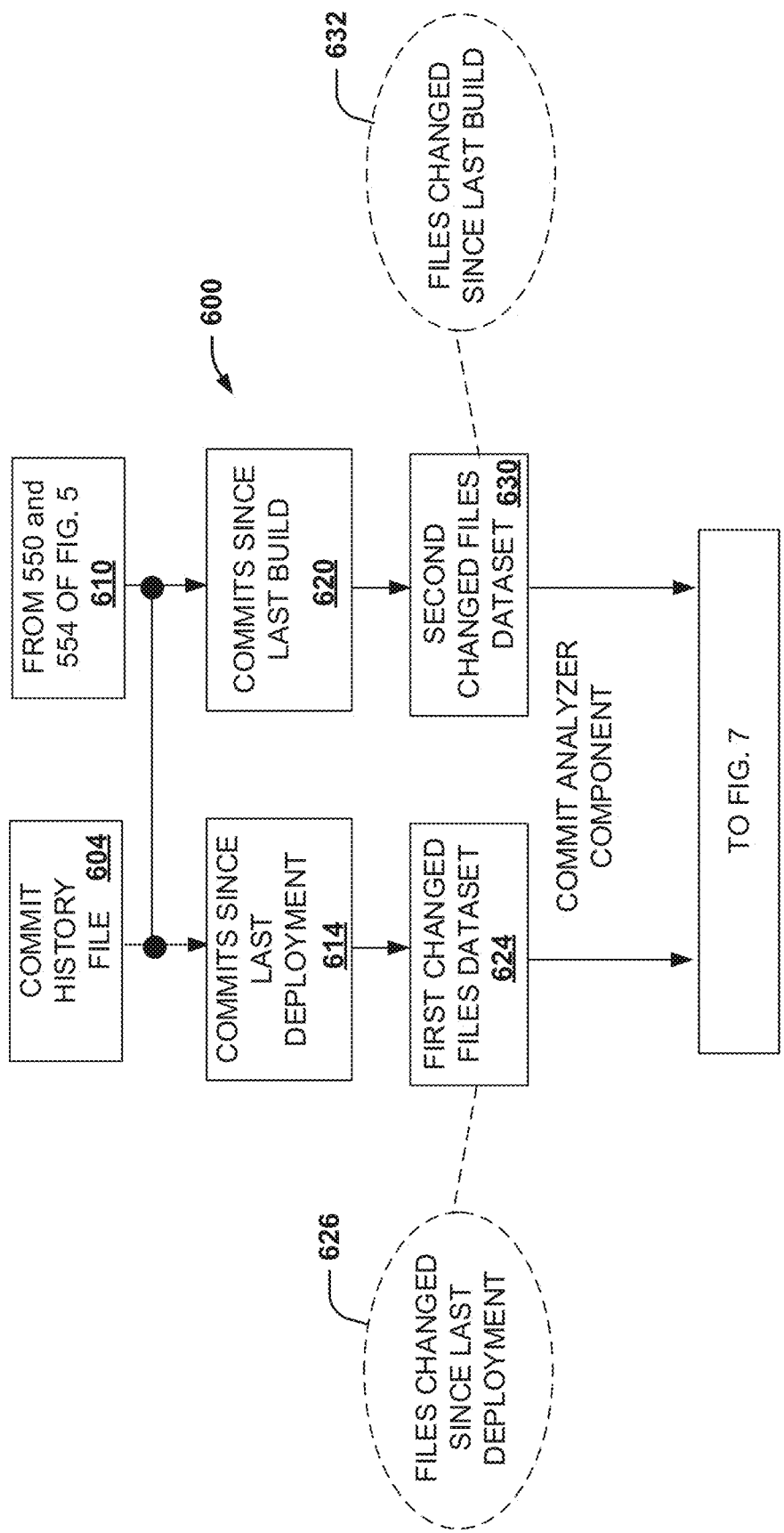
FIG. 6 illustrates a flow diagram of an example, non-limiting method that implements a commit analyzer component by processing a commit history file and input from the method of FIG. 5 that facilitates automated application deployment in accordance with one or more embodiments described herein.

FIG. 6 illustrates an example, non-limiting computer-implemented method 600 that implements a commit analyzer component (e.g., commit analyzer component 140 of FIG. 1) as described herein that processes a commit history file 604 and receives input at 610 from (550 and 554) the computer-implemented method of FIG. 5 that can facilitate automated application deployment in accordance with one or more embodiments described herein. As used herein, the term commit refers to adding the latest changes to source code (or parts thereof) to the code repository and can cause these changes, for example, to be part of a latest revision list of the repository. Unlike commits in data management, commits in version control systems can be stored in the repository indefinitely. Thus, when other users perform an update or a checkout from the repository, they can receive the latest committed version, unless they specify a desire to retrieve a previous version of the source code in the repository. Such systems can allow rolling back to previous versions as well.

At 614 of the computer-implemented method 600, commits since last deployment can be processed and can include versions/commits created to the system since a last/previous deployment of the respective service involved. At 620, commits since a last build can be processed representing versions/commits since the last/previous build of the respective services involved. A 624, a first changed files dataset can be generated indicating files changed 626 since a last/previous deployment of the respective components associated with the respective deployments. At 630, a second changed files dataset can be generated indicating files that have changed 632 to the last/previous build of the respective components of the system. As shown, dataset output from 624 and 630 can be passed to a service dependency analyzer component implemented by the computer-implemented method of FIG. 7.

Figure 7:
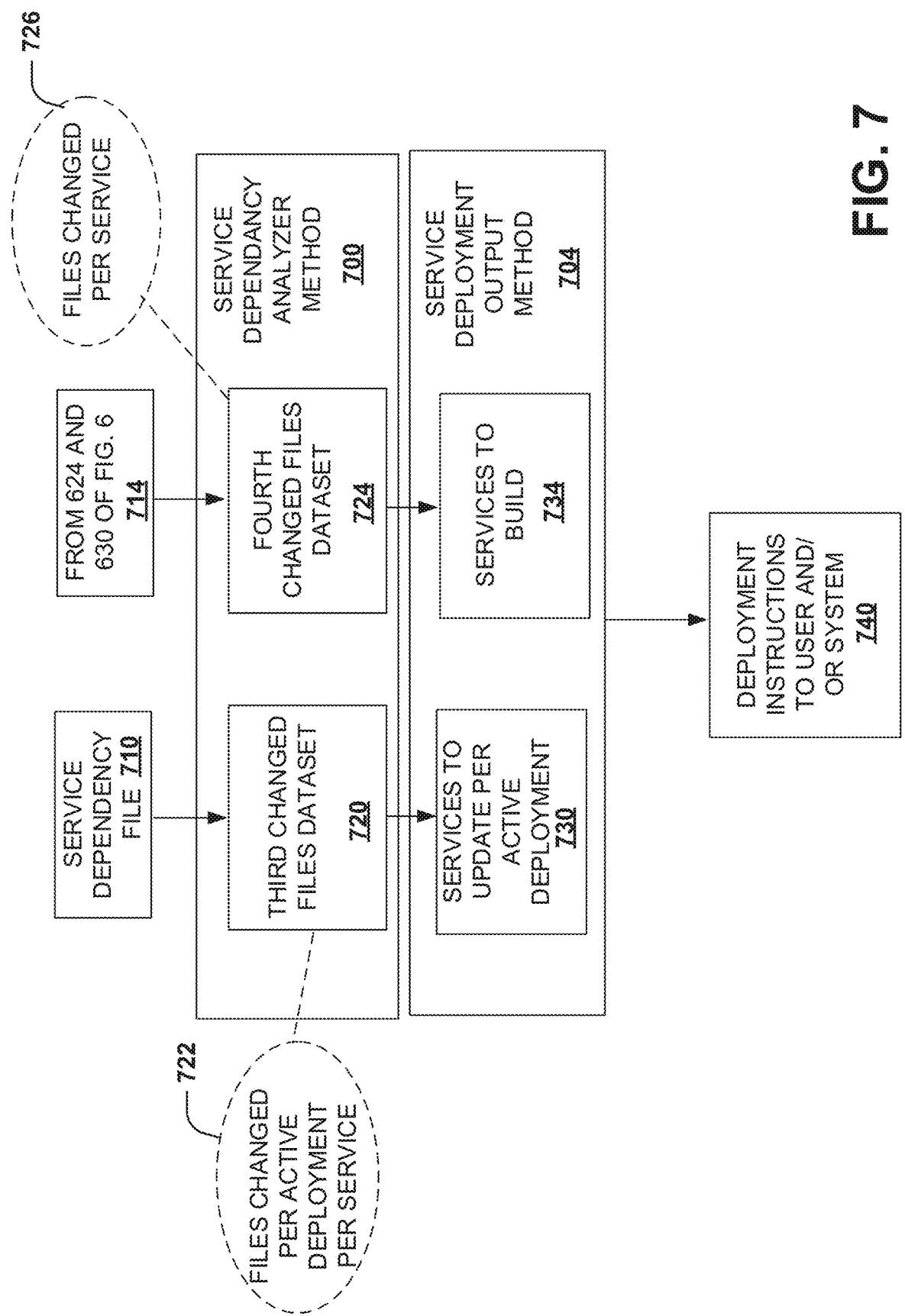
FIG. 7 illustrates a flow diagram of an example, non-limiting method that implements a service dependency analyzer component and service dependency output component that facilitates automated application deployment in accordance with one or more embodiments described herein.

FIG. 7 illustrates an example, non-limiting computer-implemented method implementing a service dependency analyzer component at 700 (e.g., 144 of FIG. 1) and implementing a service deployment output component at 704 (120 of FIG. 1, 420 of FIG. 4) that facilitate automated application deployment in accordance with one or more embodiments described herein. The computer-implemented 700 can process a service dependency file 710 and output from 624 and 630 from the computer-implemented method of FIG. 6 shown at 714. As mentioned previously, the service dependency file 710 can include service dependencies for the respective services in the system and associated list of dependencies in the form of file names for the service. At 720, a third changed files dataset can be generated indicating files that have changed at 722 per active deployment per service which can include files changed since a last/previous build of the respective active/running components for the associated deployments. At 724, a fourth changed files dataset can be generated indicating files that have changed at 726 per service representing services that have changed since a last build due to file changes. At 730, the computer-implemented method implementing the service deployment output component at 704 can generate instructions listing services to update per active deployment that represents services to update after building.

As mentioned previously with respect to FIG. 5, the instructions at 730 can be generated as lists (see e.g., process 540) that can be generated, for example, by outputting data to a file indicating respective components of a given deployment that are active and/or running. Such components may be frequently called and/or running components, for example, such as components that are executing background or foreground tasks. At 734, instructions for services to build can be generated representing services to rebuild. Similar to the process 730, the instructions 734 can also be generated as lists, for example, that can be generated by outputting data to a file indicating respective services to build based on detected model changes as described herein. Output deployment instructions from the computer-implemented method implementing the service deployment output component at 704 can be provided in an output file 740 that can be employed to facilitate deployment of an application, application service, and/or components by a user and/or system implementing the deployment instructions declared in the output file.

Figure 8:
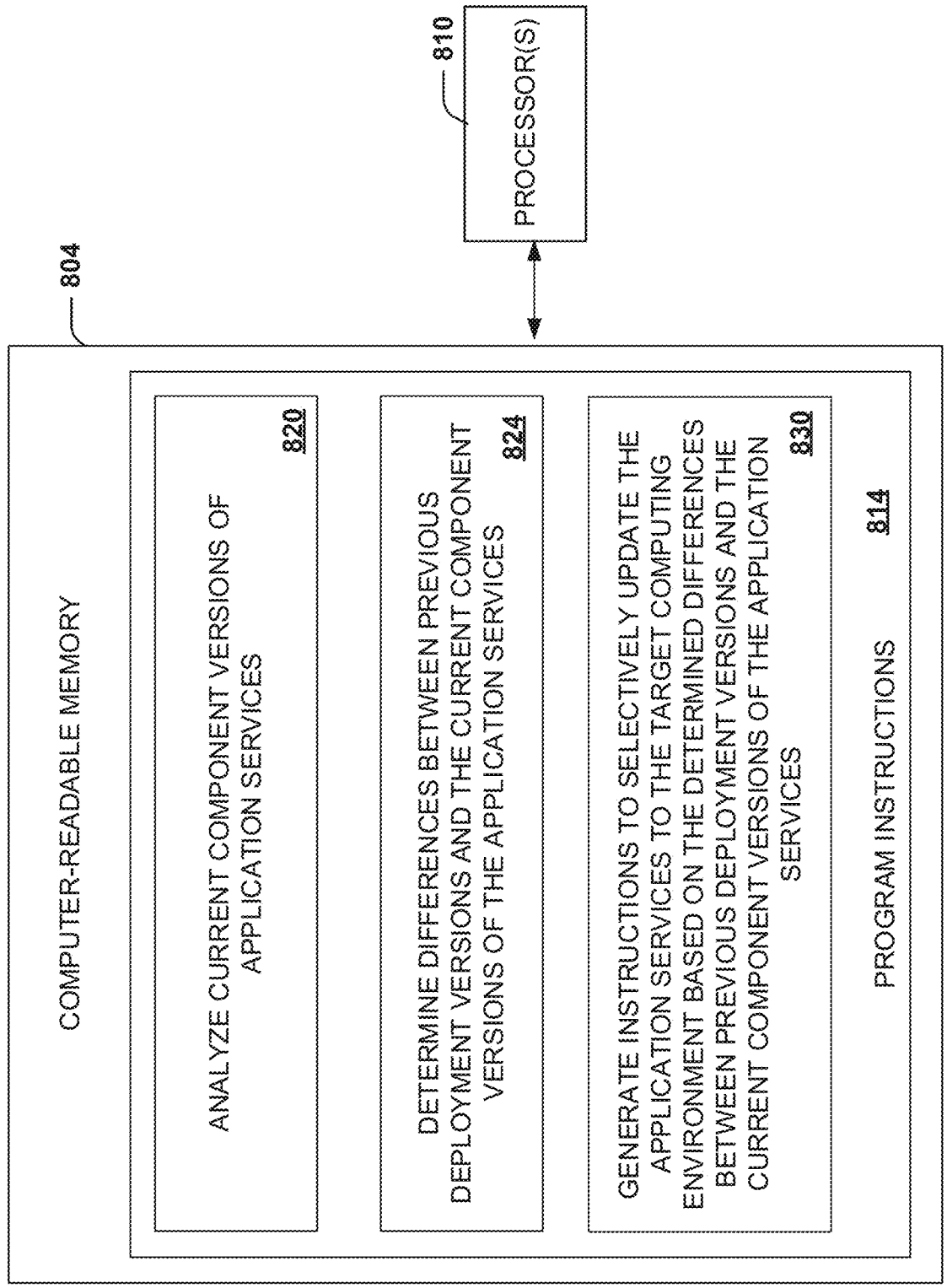
FIG. 8 illustrates a block diagram of an example, non-limiting computer-readable memory and processor executing program instructions therefrom that facilitates automated application deployment in accordance with one or more embodiments described herein.

FIG. 8 illustrates an example, non-limiting computer-readable memory 804 having executing program instructions stored thereon that facilitate automated application deployment in accordance with one or more embodiments described herein. In an example embodiment, the computer-readable memory 804 and program instructions can be implemented as a computer program product that facilitate deployment of an application. In one example, the program instructions 814 can be executable by the processing component 810 and cause the processing component to analyze current component versions of application services at 820. At 824, the program instructions 814 can determine differences between previous deployment versions and the current component versions of the application services. At 830, the program instructions 814 can generate instructions to selectively update the application services to a target computing environment based on the determined differences between previous deployment versions and the current component versions of the application services. Other program instructions 814 not shown can specify: a commit history file representing code image versions of the application services; a service dependency file representing code image dependency relationships between the application services; and a deployment history file representing a deployment version of the respective image code versions of the application services.

Figure 9:
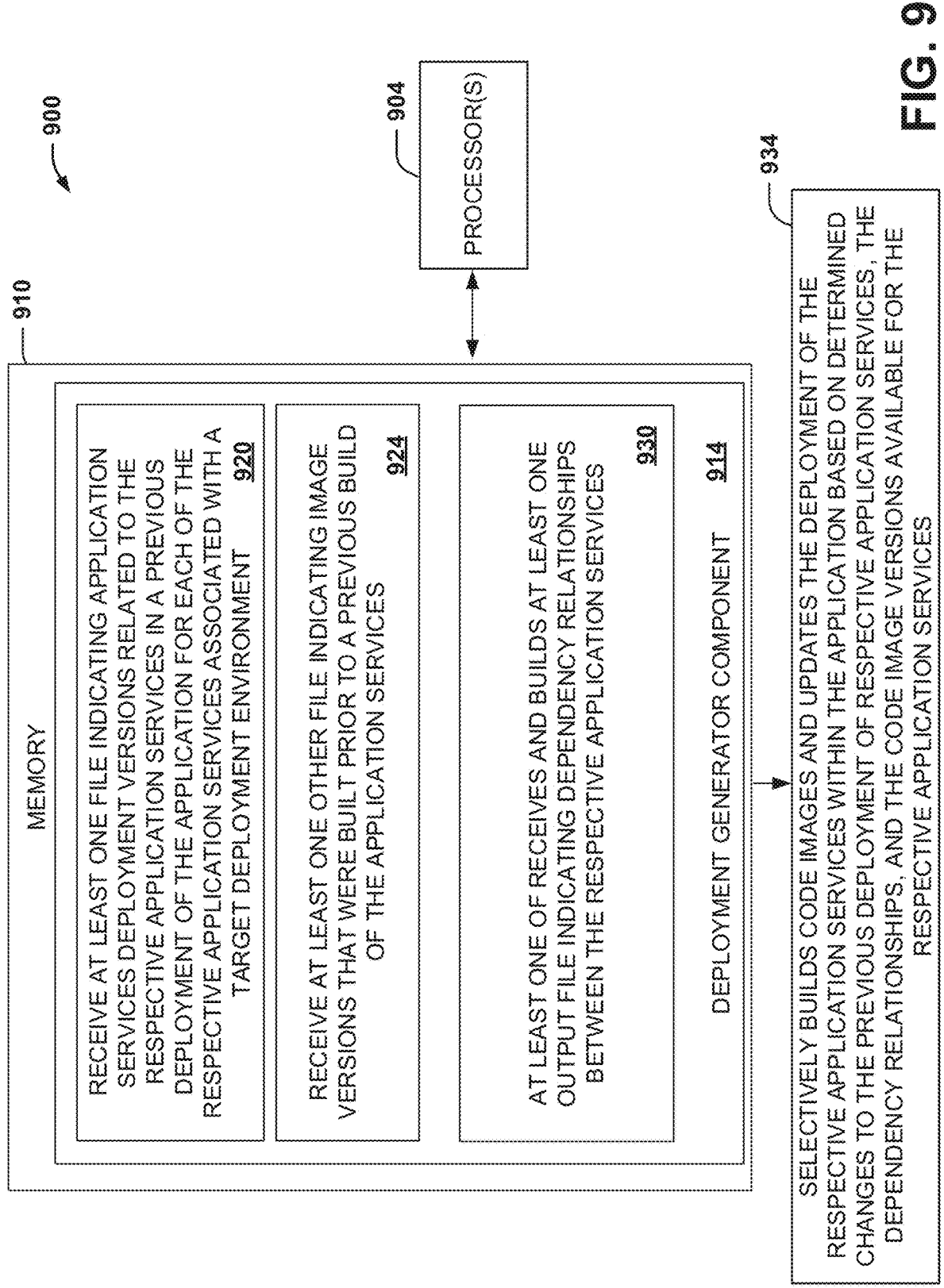
FIG. 9 illustrates a block diagram of an example, alternative non-limiting system that facilitates automated application deployment in accordance with one or more embodiments described herein.

FIG. 9 illustrates an example, alternative non-limiting system 900 that facilitates automated application deployment in accordance with one or more embodiments described herein. The system 900 can include a processor 904 configured to execute computer components stored in memory 910 that when executed cause the system to perform operations. The computer components can include a deployment generator component 914 that can deploy an application comprising a plurality of application services. At 920, the deployment generator component 914 can receive (e.g., from service dependency file 130 of FIG. 1) at least one file indicating application services deployment versions related to the respective application services in a previous deployment of the application for the respective application services associated with a target deployment environment. At 924, the deployment generator component 914 can receive (e.g., from deployment history file 134 of FIG. 1) at least one other file indicating image versions that were built prior to a previous build of the application services. At 930, the deployment generator component 930 can generate an output file indicating dependency relationships between the respective application services.

At 934, a service deployment output component operative with the deployment generator component 914 can selectively build code images and update the deployment of the respective application services within the application based on determined changes to the previous deployment of respective application services, the dependency relationships, and the code image versions available for the respective application services. Although not shown, the deployment generator component 914 can receive a commit history file representing code image versions of the application services, a service dependency file representing code image dependency relationships between the application services, and a deployment history file representing a deployment version of the respective image code versions of the application services.

Figure 10:
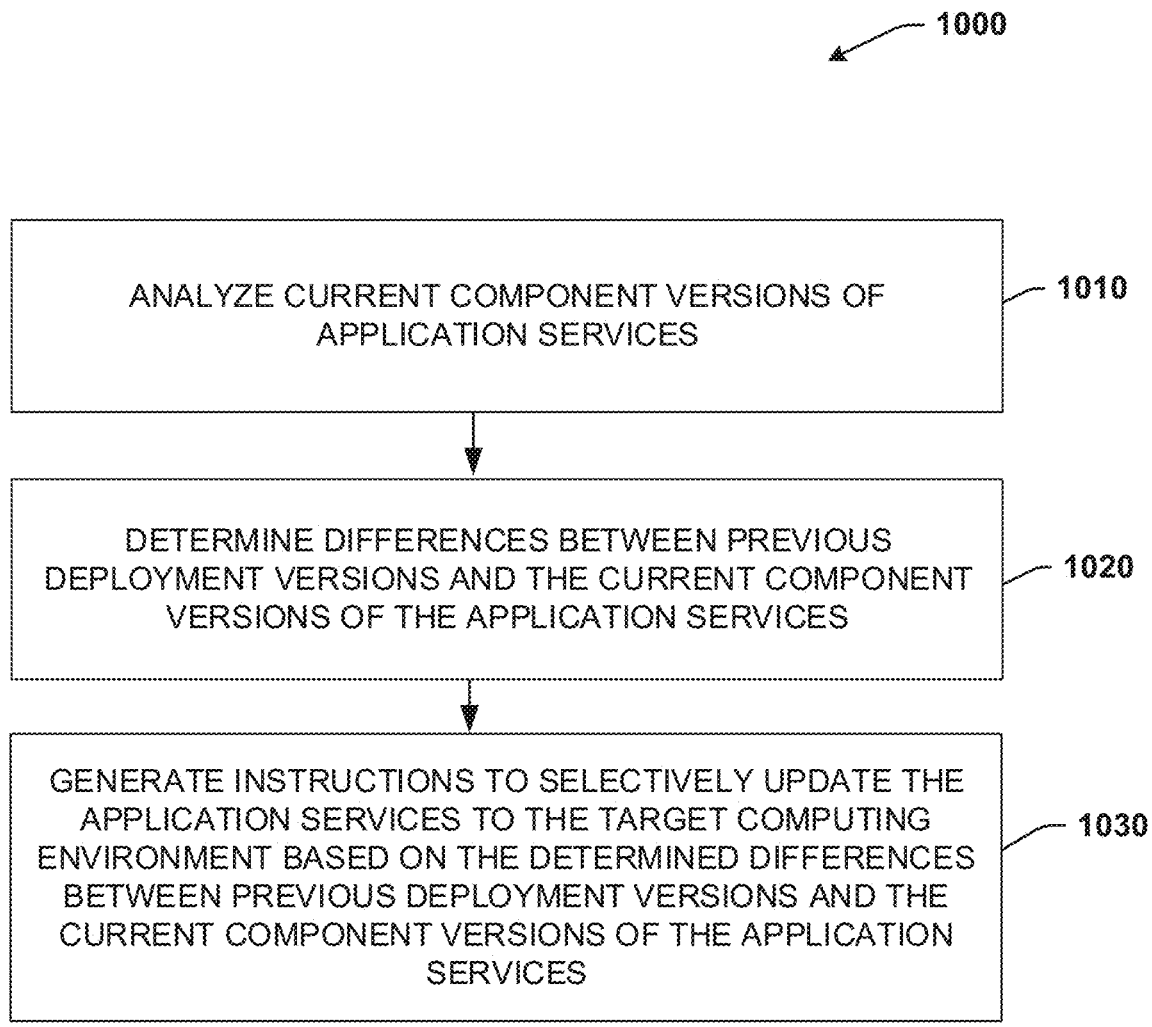
FIG. 10 illustrates a flow diagram of an example, non-limiting computer-implemented method that facilitates automated application deployment in accordance with one or more embodiments described herein.
Figure 11:
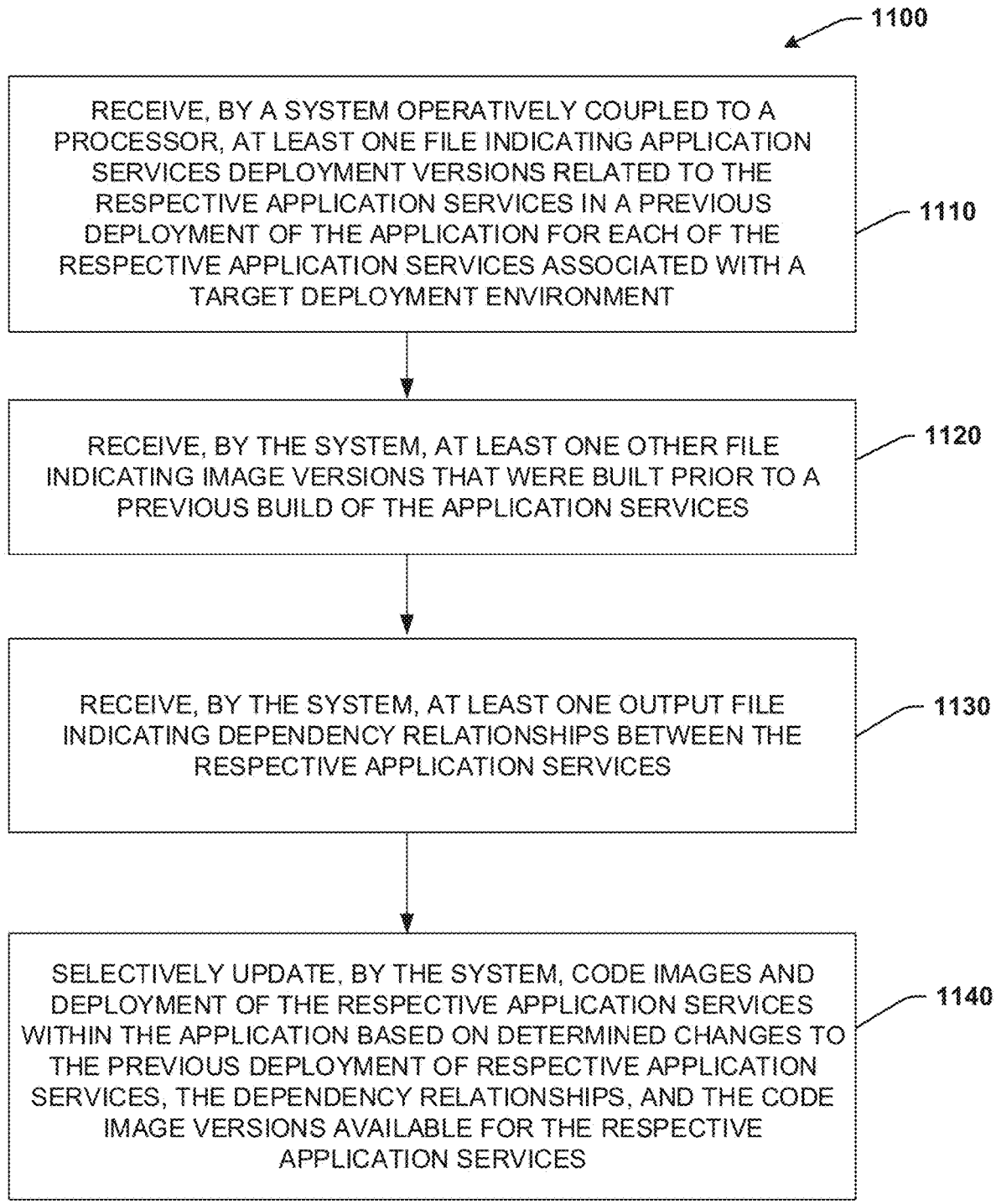
FIG. 11 illustrates a flow diagram of an example, alternative non-limiting computer-implemented method that facilitates automated application deployment in accordance with one or more embodiments described herein.

FIGS. 10 and 11 illustrate computer-implemented methodologies via flow diagram in accordance with the disclosed subject matter herein. Methodology and process flows related to FIGS. 10 and 11 are also depicted and described above with respect to FIGS. 5 through 7. For simplicity of explanation, the methodologies are depicted and described as a series of acts. It is to be understood and appreciated that the subject methodologies are not limited by the acts illustrated and/or by the order of acts, for example acts can occur in various orders and/or concurrently, and with other acts not presented and described herein. Furthermore, not all illustrated acts may be employed to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any suitable computer/machine-readable device and/or storage media.

FIG. 10 illustrates an example non-limiting computer-implemented method 1000 that facilitates automated application deployment in accordance with one or more embodiments described herein. At 1010, the computer-implemented method 1000 can include analyzing, by a system having a processor executing instructions from a memory, current component versions of application services (e.g., via deployment generator component 114 of FIG. 1). At 1020, the computer-implemented method 1000 can include determining, by the system, differences between previous deployment versions and the current component versions of the application services (e.g., via deployment generator component 114 of FIG. 1). At 1030, the computer-implemented method can include generating instructions, by the system, that selectively update the application services to the target computing environment based on the determined differences between previous deployment versions and the current component versions of the application services (e.g., via service deployment output component 120 of FIG. 1).

Although not shown, the computer-implemented method 1000 can include: processing, by the system, a commit history file representing code image versions of the application services; processing, by the system, a service dependency file representing code image dependency relationships between the application services; and processing a deployment history file representing a deployment version of the respective image code versions of the application services. The computer-implemented method 1000 can also include processing the commit history file; and generating a first changed files dataset indicating file changes between a previous deployment of the code image versions in commit history file and subsequent code image versions that were created since the previous deployment. In another example, the computer-implemented method 1000 can include processing the deployment history file; and generating a second changed files dataset indicating file changes between a previous build of the code image versions in deployment history file and subsequent code image versions that were built since the previous build. The computer-implemented method 1000 can also include processing the first changed files dataset service dependency file; and generating a third changed files dataset indicating files changes since a last deployment of active component versions for respective active deployments of the application services. In another example, the computer-implemented method 1000 can also include processing the second changed files dataset and the service dependency file; and generating a fourth changed files dataset indicating files changes since a last build of respective component versions for the respective application services. In yet another example, the computer-implemented method 1000 can also include generating the instructions to selectively update the application services to the target computing environment based on the third changed files dataset or the fourth changed files dataset. The instructions to selectively update the application services to the target computing environment can include, for example, at least one of services to update per active deployment based on the third changed files dataset and services to build based on the fourth changed files dataset.

FIG. 11 illustrates an example, alternative non-limiting computer-implemented method 1100 that facilitates automated application deployment in accordance with one or more embodiments described herein. At 1110, the computer-implemented method 1100 can include receiving, by a system operatively coupled to a processor, at least one file indicating application services deployment versions related to the respective application services in a previous deployment of the application for each of the respective application services associated with a target deployment environment (e.g., deployment generator component 114 of FIG. 1). At 1120, the computer-implemented method 1100 can include receiving, by the system, at least one other file indicating image versions that were built prior to a previous build of the application services (e.g., via deployment generator component 114). At 1130, the computer-implemented method 1100 can include receiving, by the system, at least one output file indicating dependency relationships between the respective application services (e.g., via deployment generator component 114 of FIG. 1). At 1140, the computer-implemented method 1100 can include selectively updating, by the system, code images and deployment of the respective application services within the application based on determined changes to the previous deployment of respective application services, the dependency relationships, and the code image versions available for the respective application services (e.g., service deployment output component 120 of FIG. 1). Although not shown, the computer-implemented method 1100 can include receiving, by the system, a commit history file representing code image versions of the application services; processing, by the system, a service dependency file representing code image dependency relationships between the application services; and receiving, by the system, a deployment history file representing a deployment version of the respective image code versions of the application services.

Figure 12:
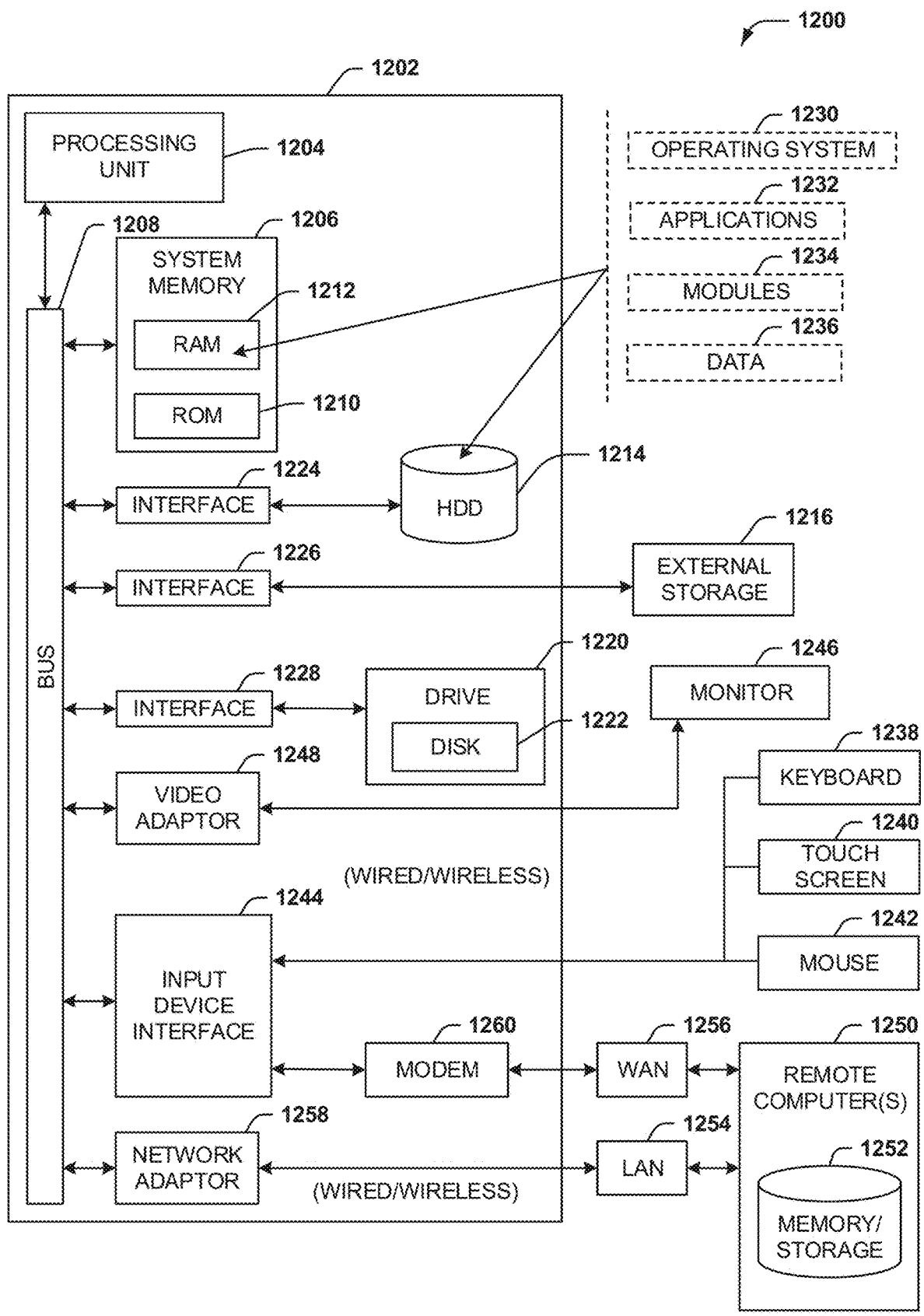
FIG. 12 illustrates a block diagram of an example, non-limiting operating environment in which one or more embodiments described herein can be implemented that facilitate automated application deployment.

In order to provide additional context for various embodiments described herein, FIG. 12 and the following discussion are intended to provide a general description of a suitable computing environment 1200 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments described herein can be also practiced in distributed computing environments where certain tasks are performed by remote processing devices that are linked through a communications network. In a distributed computing environment, program modules can be located in local and/or remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, and computer-executable instructions. In some embodiments, nonvolatile storage of data can include any type of data and/or instructions. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
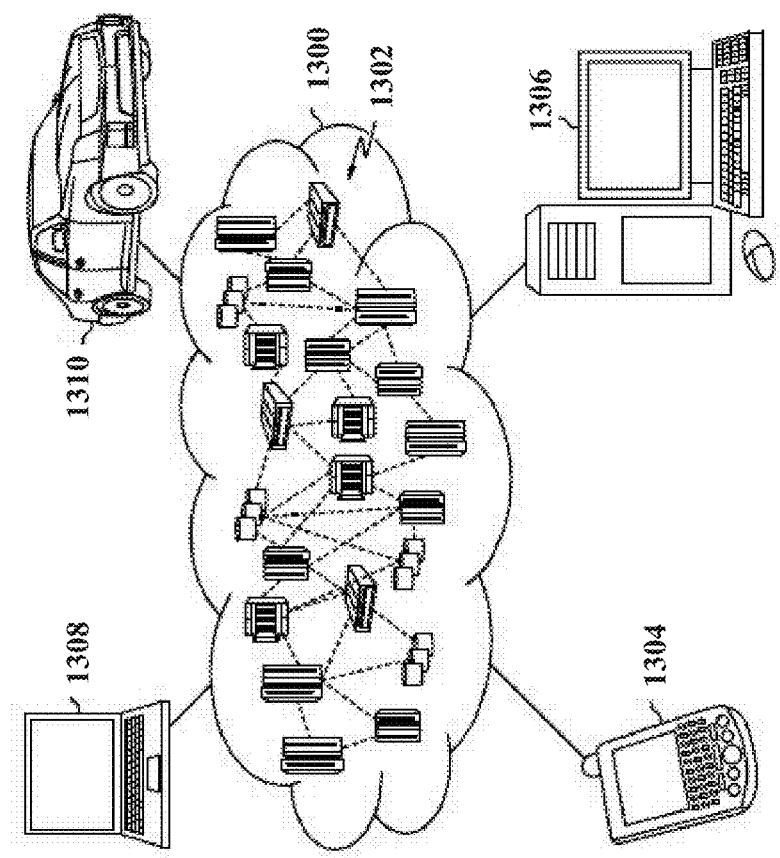
FIG. 13 illustrates an example cloud computing environment in accordance with one or more embodiments described herein that facilitate automated application deployment.
Figure 14:
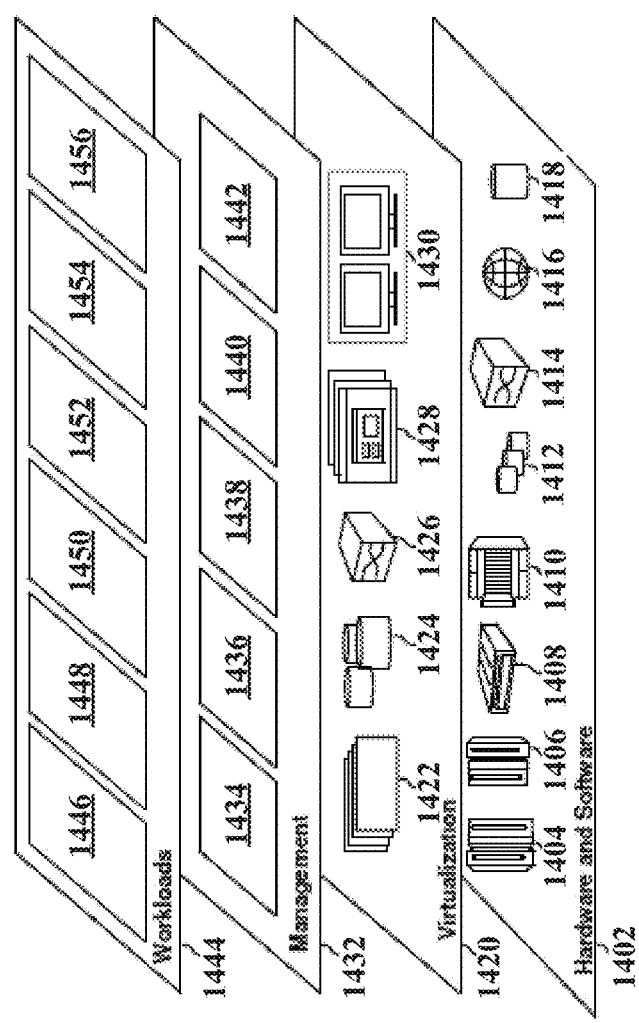
FIG. 14 illustrates example abstraction model layers provided by the cloud computing environment depicted in FIG. 13 in accordance with one or more embodiments described herein that facilitate automated application deployment.

FIGS. 13 and 14 relate to example cloud-computing environments that facilitate automated application deployment that can be implemented according to the example embodiments described herein. It is to be understood that although this disclosure includes a detailed description on cloud computing, implementation of the teachings recited herein are not limited to a cloud computing environment. Rather, embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 13 illustrates an example cloud computing environment 1300 in accordance with one or more embodiments described herein that facilitate automated application deployment. As shown, the cloud computing environment 1300 includes one or more cloud computing nodes 1302 with which local computing devices used by cloud consumers, such as, for example, personal digital assistant (PDA) or cellular telephone 1304, desktop computer 1306, laptop computer 1308, and/or automobile computer system 1310 may communicate. Nodes 1302 may communicate with one another. They may be grouped (not shown) physically or virtually, in one or more networks, such as Private, Community, Public, or Hybrid clouds as described hereinabove, or a combination thereof. This allows the cloud computing environment 1300 to offer infrastructure, platforms and/or software as services for which a cloud consumer does not need to maintain resources on a local computing device. It is understood that the types of computing devices 1304-1310 shown in FIG. 13 are intended to be illustrative only and that computing nodes 1302 and cloud computing environment 1300 can communicate with any type of computerized device over any type of network and/or network addressable connection (e.g., using a web browser).

FIG. 14 illustrates example abstraction model layers provided by the cloud computing environment depicted in FIG. 13 in accordance with one or more embodiments described herein that facilitate automated application deployment. A set of functional abstraction layers is provided by the cloud computing environment 1300 of FIG. 13 is shown. Repetitive description of like elements employed in other embodiments described herein is omitted for sake of brevity. It should be understood in advance that the components, layers, and functions shown in FIG. 14 are intended to be illustrative only and embodiments described herein are not limited thereto. As depicted, the following layers and corresponding functions are provided.

Hardware and software layer 1402 can include hardware and software components. Examples of hardware components include: mainframes 1404; RISC (Reduced Instruction Set Computer) architecture-based servers 1406; servers 1408; blade servers 1410; storage devices 1412; and networks and networking components 1414. In some embodiments, software components include network application server software 1416 and database software 1418.

Virtualization layer 1420 can provide an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 can provide dynamic procurement of computing resources and other resources that are utilized to perform tasks within the cloud computing environment. Metering and Pricing 1436 can provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1438 can provide access to the cloud computing environment for consumers and system administrators. Service level management 1440 can provide cloud computing resource allocation and management such that required service levels are met. Service Level Agreement (SLA) planning and fulfillment 1442 can provide pre-arrangement for, and procurement of, cloud computing resources for which a future requirement is anticipated in accordance with an SLA.

Workloads layer 1444 can provide examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and differentially private federated learning processing 1456. Various embodiments described herein can utilize the cloud computing environment described with reference to FIGS. 13 and 14 to execute one or more differentially private federated learning processes in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer-executable components; and
    a processor, operably coupled to the memory, that executes the computer-executable components stored in the memory, wherein the computer-executable components comprise:
        a deployment generator component that analyzes current component versions of application services and determines differences with previous deployment versions of the application services deployed to a target computing environment, wherein analysis of the current component versions and determination of differences with previous deployment versions comprises determination of differences between current and previous versions of models of the application services, wherein the models comprise abstracted language that describes various aspects of functionality of the application services, wherein the models act as a description of a domain of a second system wherein the second system is associated with the target computing environment and wherein the models provide a component diagram that specifies components of the second system;
        a service deployment output component that generates instructions to selectively update the application services to the target computing environment based on the determined differences between the previous deployment versions and the current component versions of the application services;
        a model differencing component that outputs selected ones of the models that have changed from the previous deployment versions, wherein a number of the selected ones of the models is less than a number of the models; and
        a code generator selector component that:
            analyzes the models that have changed output from the model differencing component and identifies services to generate based on the analyzed modes that have changed; and
            employs code mappings as an input file to determine which code generators to select, wherein selection of the code is based on the models that have changed and the application services associated with the models that have changed.

2. The system of claim 1, wherein the current component versions include at least one of a commit history file representing code image versions of the application services, a service dependency file representing code image dependency relationships between the application services, or a deployment history file representing a deployment version of image code versions of the application services.

3. The system of claim 2, further comprising a commit analyzer component that processes the commit history file and generates a first changed files dataset indicating file changes between a previous deployment of the code image versions in the commit history file and subsequent code image versions that were created since the previous deployment.

4. The system of claim 3, wherein the commit analyzer component processes the deployment history file and generates a second changed files dataset indicating file changes between a previous build of the code image versions in the deployment history file and subsequent code image versions that were built since the previous build.

5. The system of claim 4, further comprising a service dependency analyzer component that processes the first changed files dataset from the commit analyzer component and processes the service dependency file and generates a third changed files dataset indicating file changes since a last deployment of active component versions for respective active deployments of the application services.

6. The system of claim 5, wherein the service dependency analyzer component processes the second changed files dataset from the commit analyzer component and processes the service dependency file and generates a fourth changed files dataset indicating file changes since a last build of respective component versions for the respective application services.

7. The system of claim 5, wherein service deployment output component generates the instructions that selectively update the application services to the target computing environment based on the third changed files dataset or the fourth changed files dataset.

8. The system of claim 7, wherein the instructions that selectively update the application services to the target computing environment include at least one of services that update per active deployment based on the third changed files dataset and services that build based on the fourth changed files dataset.

9. The system of claim 1, wherein the instructions are directed to at least one of a user or an automated system for the deployment of the current component versions of the application services.

10. The system of claim 1, further comprising a code repository that stores the current component versions and at least one code image that produce the current component versions based on instructions specified by a model-driven engineering model.

11. The system of claim 10, wherein the instructions specified by the model-driven engineering model includes a Unified Modeling Language (UML).

12. A computer-implemented method, comprising:
    analyzing, by a system operatively coupled to a processor, current component versions of application services;
    determining, by the system, differences between previous deployment versions and the current component versions of the application services, wherein the analyzing the current component versions and the determining the differences between previous deployment versions and the current component versions comprises:
  determining differences between current and previous versions of models of the application services, wherein the models comprise abstracted language that describes various aspects of functionality of the application services; and
  determining metadata that describes the differences between current and previous versions of models;
generating instructions, by the system, that selectively update the application services to the target computing environment based on the determined differences between previous deployment versions and the current component versions of the application services;
outputting, by the system, selected ones of the models that have changed from the previous deployment versions, wherein a number of the selected ones of the models is less than a number of the models;
analyzing, by the system, the models that have changed output from the model differencing component and identifies services to generate based on the analyzed modes that have changed employing, by the system, code mappings as an input file to determine which code generators to select based on the models that have changed and the application services associated with the models that have changed; and
employing, by the system, code mappings as an input file to determine which code generators to select, wherein selection of the code is based on the models that have changed and the application services associated with the models that have changed.

13. The computer-implemented method of claim 12, further comprising:
  receiving, by the system, a commit history file representing code image versions of the application services;
  processing, by the system, a service dependency file representing code image dependency relationships between the application services, and
  receiving, by the system, a deployment history file representing a deployment version of image code versions of the application services.

14. The computer-implemented method of claim 13, further comprising:
  processing, by the system, the commit history file; and
  generating, by the system, first changed files dataset indicating file changes between a previous deployment of the code image versions in commit history file and subsequent code image versions that were created since the previous deployment.

15. The computer-implemented method of claim 14, further comprising:
  processing, by the system, the deployment history file; and
  generating by the system, a second changed files dataset indicating file changes between a previous build of the code image versions in deployment history file and subsequent code image versions that were built since the previous build.

16. The computer-implemented method of claim 15, further comprising:
  processing, by the system, the first changed files dataset and the service dependency file; and
  generating, by the system, a third changed files dataset indicating file changes since a last deployment of active component versions for respective active deployments of the application services.

17. The computer-implemented method of claim 16, further comprising:
  processing, by the system, the second changed files dataset and the service dependency file; and
  generating, by the system, a fourth changed files dataset indicating file changes since a last build of respective component versions for the respective application services.

18. The computer-implemented method of claim 17, further comprising generating, by the system, the instructions that selectively update the application services to the target computing environment based on the third changed files dataset or the fourth changed files dataset, wherein the instructions to selectively update the application services to the target computing environment include at least one of services to update per active deployment based on the third changed files dataset or services to build based on the fourth changed files dataset.

19. A computer program product that facilitates deployment of an application, the computer program product comprising a computer readable memory having program instructions embodied therewith, the program instructions executable by a processor to cause the processor to:
  analyze, by the processor, current component versions of application services;
  determine, by the processor, differences between previous deployment versions and the current component versions of the application services, wherein analysis of the current component versions and determination of differences with previous deployment versions comprises determination of differences between current and previous versions of models of the application services, wherein the models comprise abstracted language and metadata that describe various aspects of functionality of the application services;
  generate, by the processor, based on the determination of the differences between current and previous versions of models, and based on code mappings, instructions to selectively update the application services to a target computing environment;
  output, by the processor, selected ones of the models that have changed from the previous deployment versions, wherein a number of the selected ones of the models is less than a number of the models;
  analyze, by the processor, the models that have changed output from the model differencing component and identifies services to generate based on the analyzed modes that have changed employing, by the system, code mappings as an input file to determine which code generators to select based on the models that have changed and the application services associated with the models that have changed; and
  employ, by the processor, code mappings as an input file to determine which code generators to select, wherein selection of the code is based on the models that have changed and the application services associated with the models that have changed.

20. The computer program product of claim 19, further comprising instructions to specify:
  receive, by the processor, commit history file representing code image versions of the application services;

process, by the processor, a service dependency file representing code image dependency relationships between the application services; and receive, by the processor, a deployment history file representing a deployment version of image code versions of the application services.

\* \* \* \* \*